United States Patent [19]
Pickles

[11] 3,973,288
[45] Aug. 10, 1976

[54] SEAT RECLINER
[75] Inventor: Joseph Pickles, Birmingham, Mich.
[73] Assignee: Ferro Manufacturing Corporation, Detroit, Mich.
[22] Filed: Feb. 26, 1975
[21] Appl. No.: 552,974

[52] U.S. Cl. ............................................... 16/146
[51] Int. Cl.² ......................................... E05D 11/10
[58] Field of Search ............ 16/139, 142, 145, 146, 16/147, 148, 180, 189, 144; 297/354, 366–372, 379

[56] References Cited
UNITED STATES PATENTS

| | | |
|---|---|---|
| 3,099,485 | 7/1963 | Beierbach et al. .................. 16/189 X |
| 3,299,466 | 1/1967 | Werner ................................ 16/146 |
| 3,432,881 | 3/1969 | Putsch et al. ........................ 16/146 |
| 3,471,892 | 10/1969 | Resag et al. ......................... 16/139 |
| 3,608,128 | 9/1971 | Faust .................................... 16/146 |
| 3,788,698 | 1/1974 | Perkins ............................. 16/139 X |
| 3,794,380 | 2/1974 | Mertz ............................... 16/146 X |
| 3,840,268 | 10/1974 | Turner et al. .................... 16/145 X |

*Primary Examiner*—G. V. Larkin
*Attorney, Agent, or Firm*—Whittemore, Hulbert & Belknap

[57] ABSTRACT

An adjustable seat back support capable of permitting adjustment of the seat back from a substantially upright position to a reclining position, and in addition being freely movable from upright position to a forward displaced position facilitating access to the rear seat of a two-door motor vehicle.

20 Claims, 2 Drawing Figures

SEAT RECLINER

BRIEF SUMMARY OF THE INVENTION

The present invention relates to support means for a seat back of a vehicle seat. It will of course be understood that the seat itself may be adjustable forwardly, and in addition may be raised vertically or tilted by selective raising and lowering of the front and rear portions thereof. During these adjustments the seat back is movable with the seat.

However, in addition to the foregoing adjustments, which may or may not be provided, the seat back itself is adjustable relative to the seat. From a substantially upright position the seat back may be inclined very substantially toward the rear to a reclining position and may be securely locked in such reclining position so that even under collision conditions the seat back will remain in locked position. It may be selectively locked in any desired position between the fully upright position and the full reclining position.

In addition, the seat back is movable forwardly from the erect position to a substantially forwardly inclined position which affords access to the rear seat of a two-door motor vehicle.

The foregoing is accomplished in general terms, by providing a bracket adapted to be fixed to the seat supporting frame and seat back supporting means pivoted thereto. The seat back supporting means is provided in the form of a movable seat back arm pivoted to the fixed bracket for free swinging movement thereon. In addition, a sector is pivoted to the fixed bracket and selectively operable means are provided for locking or latching the sector to the seat back arm so that the seat back arm and sector move as a unit during selected movement of the seat back arm.

Locking means are provided between the sector and the fixed bracket with the result that when the sector is locked with respect to the fixed bracket, the seat back arm is retained in locked condition in adjusted position.

The means for latching the seat back arm to the sector may be released, at which time the seat back arm may be swung forwardly from its upright position to afford access to the rear seat in a two-door vehicle. This last means includes a spring biased latch element which may be released manually to provide for forward tilting of the seat back. When the seat back is restored to upright position the spring biased latch returns to the position in which it latches or locks the seat back arm to the sector.

DETAILED DESCRIPTION

Figures 1, 2:
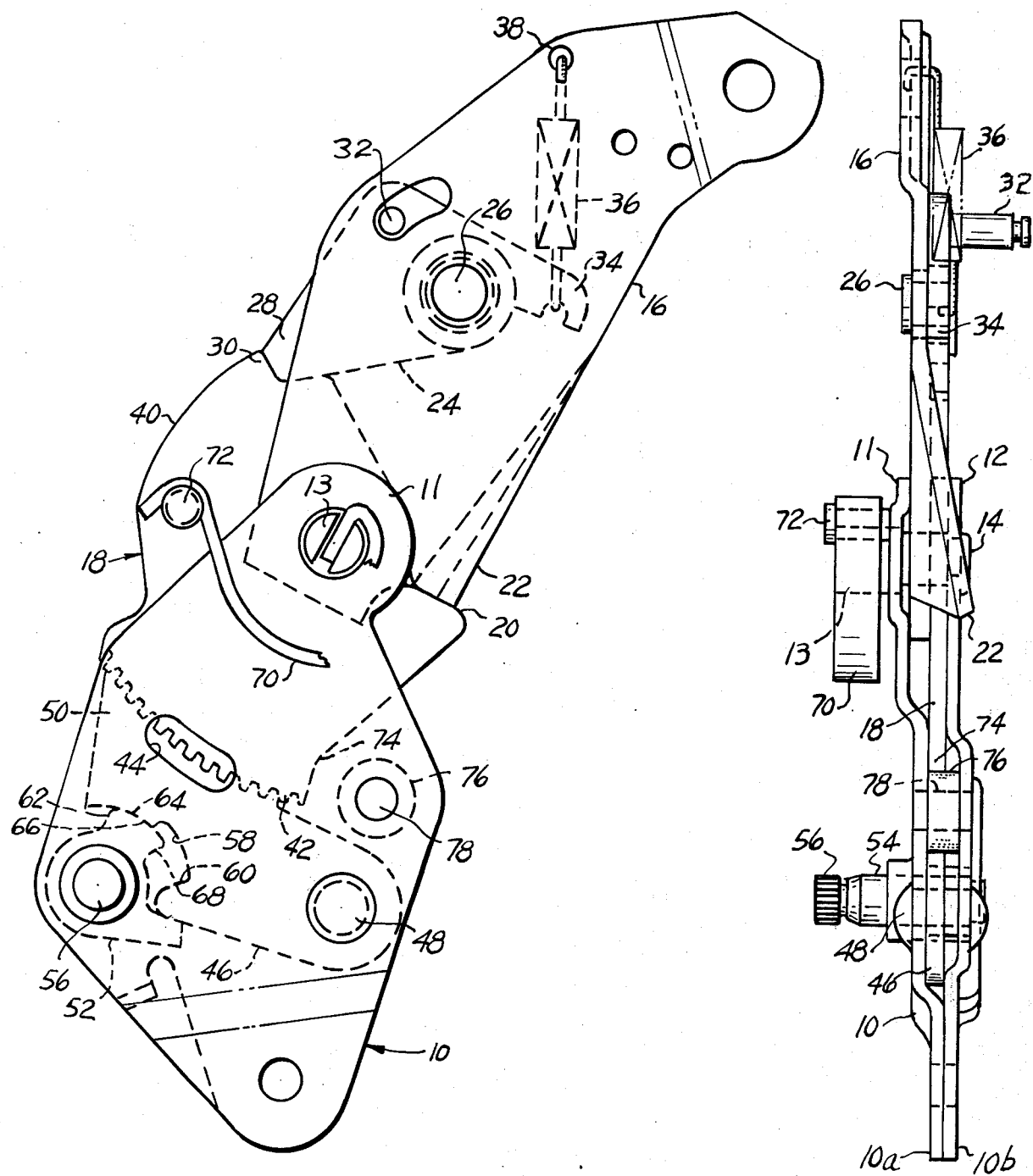
FIG. 1 is a side elevational view of the seat back supporting structure.
FIG. 2 is a side view of the structure shown in FIG. 1.

Referring now to the drawings there is illustrated the structure for connecting a seat back to the seat of a motor vehicle. It will be understood that this structure is provided at one side only of the seat and that at the opposite side, the seat back is normally mounted for free forward and rearward swinging. Of course, it is possible to provide structure similar to that shown in the Figures at both sides or ends of a seat provided coordinated locking and latching means is provided to lock or latch, or unlock or unlatch the devices at both sides of the seat simultaneously.

The structure comprises a first bracket 10 which is adapted to be fixed to seat supporting structure and which accordingly will be referred to herein as a fixed bracket. The detail of construction of this fixed bracket 10 is best illustrated in FIG. 2 where it will be observed that it is formed by two generally parallel plates 10a and 10b suitably connected and at the upper ends spaced apart to provide spaced ears 11 and 12, to receive other operating components of the mechanism therebetween.

The fixed bracket 10 carries a pivot post 13 herein shown as retained in fixed position by means of a riveted end portion 14. The ears 11 and 12 are spaced apart at the post 13 and a seat back supporting arm 16 extends into the space between the ears 11 and 12 and is pivoted for free swinging movement by the post 13. In addition, a lockable sector 18 is also pivoted to the post 13 intermediate the ears 11 and 12 and is mounted thereby for free swinging movement.

Means are provided for latching or locking the seat back arm 16 to the sector 18 and this means comprises a shoulder 20 provided on the sector and engageable by a laterally bent abutment portion 22 of the seat back arm. Shoulder 20 and portion 22 constitute fixed abutments on sector 18 and seat back support 16 respectively limiting clockwise swinging movement of the seat back arm 16 relative to the sector 18.

In addition, a spring latch member 24 is provided which is pivoted to the seat back arm by pivot means 26, the latch member having a nose portion 28 engageable against a shoulder 30 provided on the sector. As is apparent from FIG. 1, this prevents counterclockwise movement of the seat back arm 16 relative to the sector when the latch member 24 is engaged. Nose portion 28 and shoulder 30 constitute cooperating abutments operable to prevent forward movement of the seat back arm or support 16 relative to sector 18.

The latch member 24 includes a laterally projecting arm 32 to which a suitable manual operating device may be directly or indirectly connected. In addition, the latch member 24 includes an arm portion 34 carrying one end of a tension spring 36, the other end of which extends through an opening 38 provided in the seat back arm. With this arrangement the tension spring 36 retains the latch member in engaged position except when it is manually released by the operator.

When the latch member 24 is released, the seat back arm may be pivoted forwardly or counterclockwise as viewed in FIG. 1. As soon as the nose 28 clears the shoulder 30, the latch member rides along the surface 40 of the sector. The surface 40 may if desired be concentric with the axis of the post 13 or it may depart slightly from such curvature in order to provide a desired resistance to movement of the seat back from forwardly displaced position when released.

In order to retain the seat back arm 16, and hence the seat back which is rigidly connected thereto, in any selected rearwardly inclined position, the locking sector 18 is provided along an arcuate lower edge 42 thereof with a sequence of locking teeth, some of these teeth being visible in FIG. 1 through a peephole 44. A pawl 46 is located between the plates 10a and 10b and is pivoted thereat to a pivot pin indicated at 48 in FIG. 1. The pawl 46 includes an arcuate toothed end portion 50, the teeth of which are adapted to enter into fully meshed relationship with the teeth on the sector.

Operating means for the pawl 46 comprise a cam 52 which is coplanar with the pawl 46 and which has fixedly connected thereto a laterally extending shaft 54 the outer end of which, as indicated at 56, is suitably formed for engagement with a manual operating device.

The pawl 46 includes a recessed portion 58 terminating at the lower end in an ear 60. The cam 52 includes a camming arm 62 having a cam surface 64 engageable with a cam surface 66 on the sector.

Cam surfaces 64 and 66 are inclined with respect to an arcuate surface concentric with the axis of the shaft 54 so that upon counterclockwise movement of the cam the pawl is urged firmly into secure locking position as a result of engagement between the teeth of the pawl and sector. At the same time, the inclination of the cam surfaces 64 and 66 is such that a locking angle is provided which positively prevents displacement of the cam by forces applied thereto from the sector as a result of forces tending to pivot the seat back.

The cam arm 62 includes an abutment surface 68 engageable with the ear 60 so that when the cam is manually rotated clockwise as seen in FIG. 1, to a position in which the cam arm 62 moves into registration with the recess 58, the surface 68 engages the ear 60 so that the pawl is positively swung counterclockwise about its pivot support 48 to free the sector 18 and hence the seat back arm 16 for free swinging movement.

A balance spring 70 is provided, one end of which is received in a slot in the post 13 as best illustrated in FIG. 1, and the other end of which engages a pin 72 carried by the seat. In addition, the sector includes an abutment surface at 74 engageable with an abutment 76 carried by a pin 78 extending between the plates 10a and 10b as shown. Surface 74 and abutment 76 constitute fixed abutments on sector 18 and seat back support 16 respectively limiting forward or counterclockwise movement of lockable sector 18.

With this construction and with the seat back latched or locked into fixed position relative to the sector 18, the seat back with the sector 18 may be swung clockwise as seen in FIG. 1 from the upright position in which the surface 74 engages the abutment 76 to a selected rearwardly inclined or reclining position. This movement is opposed by the counterbalance spring 70 which may be selected so that when the seat back is released while the pawl is disengaged from the sector, the spring 70 will restore the seat back to its upright position. As illustrated in FIG. 1, the seat back is inclined at a small angle from the fully upright position determined by the abutment 76.

When the seat back arm 16 and sector 18 reach the substantially upright position, further forward tilting movement of the seat back is permitted only upon release of the latch member 24, at which time the seat back may be freely swung forwardly to a clearance position in which access is afforded to the rear seat of the vehicle. This forward movement of the seat back to clearance or loading position is a substantially free movement, only frictional resistance at the pivot mounting and between the latch member 24 and the surface 40 of the sector opposing such movement. Obviously of course, if desired, additional spring means could be provided between the sector 18 and the seat back so that upon release of the latch member 24, the seat back could be biased forwardly to clearance position, or if preferred, given a slight rearward bias tending to restore it to upright position. When the seat back is restored to upright position the latch member 24, under the influence of the spring 36 returns to its latching position as illustrated in FIG. 1 and thereafter, the seat back arm 16 and sector 18 operate as a unit while the seat back is given any desired rearward inclination between its fully upright position and its substantially rearwardly inclined reclining position.

What I claim as my invention is:

1. Adjustable seat back support structure comprising a fixed support, pivot means on said fixed support, a seat back support pivotally connected to said fixed support by said pivot means for free swinging movement from an upright position forwardly to a clearance position to afford access to the rear seat of a two-door vehicle and rearwardly through a range of rearwardly inclined positions to a reclining position, manually operated locking means for fixing said seat back support in adjusted position throughout said range of rearwardly inclined positions, and separately manually operable latch means for releasing said seat back support for free swinging movement between its upright position and forwardly inclined clearance position.

2. Structure as defined in claim 1 in which said locking means comprises a lockable member pivotally connected to said fixed support by said pivot means independently of said seat back support, and in which said latch means comprises selectively engageable means for rigidly interconnecting and disconnecting said lockable member and said seat back support, and in which the means for fixing said seat back in adjusted position comprises means for locking said lockable member in adjusted position.

3. Structure as defined in claim 2 in which said lockable member is in the form of a sector having teeth disposed in an arc concentric with the axis of said pivot support, and the means for locking said lockable member in adjusted position comprises a toothed pawl movable into a fixed locking position in which its teeth engage the teeth of said sector.

4. Structure as defined in claim 3 in which the means for locking said lockable member in adjusted position comprises a cam engageable with said pawl to cam said pawl into locking position.

5. Structure as defined in claim 4 in which said cam and pawl have frictionally irreversible camming surfaces to prevent movement of said cam toward pawl releasing position as a result of forces applied to said cam by said pawl resulting from forces applied to the seat back connected to said seat back support.

6. Structure as defined in claim 5 in which said pawl is pivoted to said fixed support.

7. Structure as defined in claim 6 in which said cam is pivoted to said fixed support, and said cam and pawl having abutments thereon engageable after predetermined movement of said cam in unlocking direction and effective to positively move said pawl to its unlocked position.

8. Structure as defined in claim 2 which comprises fixed abutments respectively fixed to said fixed support and said lockable member and acting therebetween to limit forward movement of said lockable member to the position in which said seat back support is in upright position when the means for rigidly interconnecting said lockable member and seat back support are engaged.

9. Structure as defined in claim 8 in which said selectively engageable means for rigidly interconnecting and disconnecting said seat back support and said lockable member comprises fixed abutments thereon engageable when said lockable member is in the position occupied when said seat back support is in upright position, and said lockable member is in its forwardmost position.

10. Structure as defined in claim 9 in which said selectively engageable means comprises an abutment and a releasable latch member operable between said seat back support and said lockable member to provide upon release for free swinging movement of said seat back support member forwardly with respect to said lockable member.

11. Structure as defined in claim 10 which comprises resilient means connected to said latch member and urging said latch member toward latched position.

12. Structure as defined in claim 11 in which said latch member is pivoted to said seat back support, and said latch member and lockable member have slidably engageable surfaces effective to retain said latch member in unlatched position while said seat back support is forwardly of its upright position and to restore said latch member to latched position upon return of said seat back support to upright position.

13. Structure as defined in claim 3 which comprises fixed abutments on said fixed support and said lockable member to limit forward movement of said lockable member to the position in which said seat back support is in upright position when the means for rigidly interconnecting said lockable member and seat back support are engaged.

14. Structure as defined in claim 13 in which said selectively engageable means for rigidly interconnecting and disconnecting said seat back support and said lockable member comprises fixed abutments thereon engageable when said seat back support is in upright position, and said lockable member is in its forwardmost position.

15. Structure as defined in claim 14 in which said selectively engageable means additionally comprises a fixed abutment and a releasable latch member engageable therewith operable between said seat back support and said lockable member to provide upon release for free swinging movement of said seat back support member forwardly with respect to said lockable member.

16. Structure as defined in claim 15 which comprises resilient means connected to said latch member and urging said latch member toward latched position.

17. Structure as defined in claim 4, said cam and pawl having frictionally irreversible camming surfaces to prevent movement of said cam toward pawl releasing position as a result of forces applied to said cam by said pawl, and fixed abutments on said fixed support and said lockable member to limit forward movement of said lockable member to the position in which said seat back support is in upright position when the means for rigidly interconnecting said lockable member and seat back support are engaged, said selectively engageable means for rigidly interconnecting and disconnecting said seat back and said lockable member additionally comprising fixed abutments thereon engageable when said lockable member is in the position occupied when said seat back support is in upright position, and said lockable member is in its forwardmost position, said selectively engageable means comprising an abutment and a releasable latch member operable between said seat back support and said lockable member to provide upon release for free swinging movement of said seat back support member forwardly with respect to said lockable member.

18. Structure as defined in claim 17 which comprises resilient means connected to said latch member and urging said latch member toward latched position.

19. Structure as defined in claim 18 in which said latch member is pivoted to said seat back support, and said latch member and lockable member have slidably engageable surfaces effective to retain said latch member in unlatched position while said seat back support is forwardly of its upright position and to restore said latch member to latched position upon return of said seat back support to upright position.

20. Adjustable seat back support structure comprising
a fixed support,
pivot means on said fixed support,
a seat back support pivotally connected to said fixed support by said pivot means for free swinging movement from an upright position forwardly to a clearance position to afford access to the rear seat of a two-door vehicle and rearwardly through a range of rearwardly inclined positions to a reclining position,
a lockable member pivoted to said pivot means for pivotal movement independently of said seat back support,
abutment means acting between said fixed support and said lockable member to limit movement thereof corresponding to forward movement of said seat back support,
locking means acting between said fixed support and said lockable member to lock said lockable member in any selected position in a range corresponding to upright and reclining position of said seat back support,
latch means to fix said seat back support to said lockable member in a single position to lock said seat back support in any selected position between upright and reclining position,
said latch means including manually releasable means to free said seat back support for forward swinging movement relative to said lockable member forwardly of upright position.

* * * * *